June 23, 1959 B. M. WILLER 2,892,116

COLOR TELEVISION RECEIVER AND PICTURE TUBE

Filed May 14, 1956 2 Sheets-Sheet 1

INVENTOR.
BERT M. WILLER
BY Davis Hoxie & Faithfull
ATTORNEY

COLOR TELEVISION RECEIVER AND PICTURE TUBE

Filed May 14, 1956 2 Sheets-Sheet 2

INVENTOR.
BERT M. WILLER
BY
Davis Hoxie & Faithfull
ATTORNEY.

2,892,116

COLOR TELEVISION RECEIVER AND PICTURE TUBE

Bert M. Willer, deceased, late of Yonkers, N.Y., by Leila Lea Frank Willer, executrix, Yonkers, N.Y.

Application May 14, 1956, Serial No. 584,830

7 Claims. (Cl. 313—92)

Figure 1:
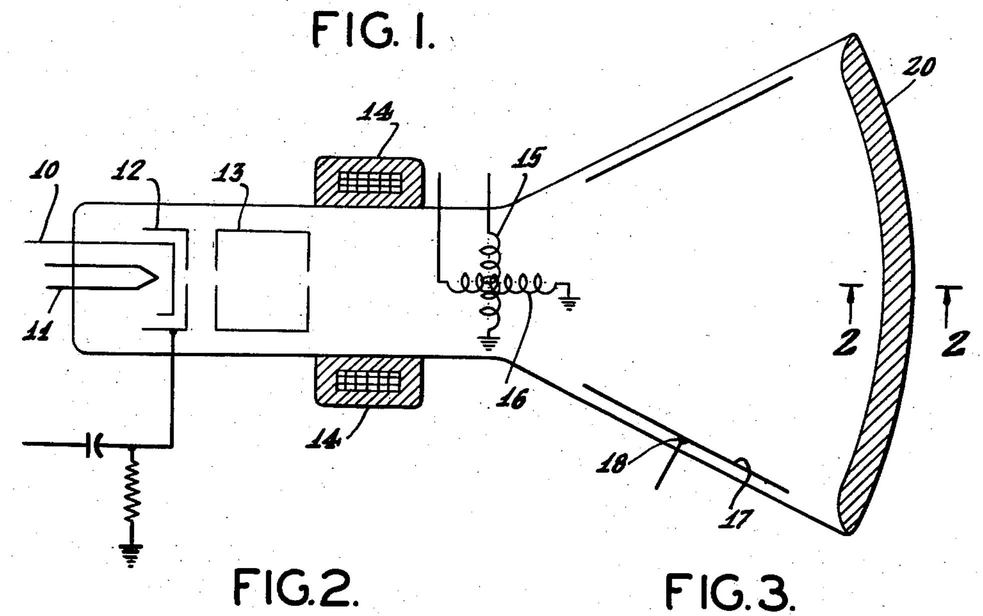

This invention is a new color television system and new multi-layer cathode-ray picture tube. It employs in the picture tube two or more discrete layers of different cathodoluminescent materials, i.e., phosphors, capable respectively of emitting different colors when activated by the electrons of the cathode ray. In part its novelty is in the means of selection as among these layers by which at any instant one color alone is seen at the tube face. As in former systems, different color components of the scene are presented at the tube face in such rapid succession that the eye sees the picture in polychrome.

In the past there have been a number of attempts to employ multi-layer phosphors of different colors, with sequential selection of the particular layer to be fully activated at any instant. The system which apparently received the most attention was that in which the selection of the color layer to be fully activated at any instant is based on a selective control of the velocity of the electron beam in response to the signal. The principles there invoked are (1) that the energy absorbed from the beam per unit of distance of penetration through the phosphor layer is inversely proportional to the velocity of the beam, so that there is a maximum of luminescence at the depth of penetration at which the beam velocity is least; and (2) that the depth of penetration at which this condition of minimum velocity and maximum luminescence exists is dependent upon the initial velocity of the beam as it enters the phosphor mass. Hence by control of that initial velocity, as through control of accelerating anode voltages, the condition of maximum luminescence is made to occur in one or another of the several layers, with consequent emission of light predominantly from the one layer and therefore predominantly of one color. While that selected layer is being scanned in whole or in part, signal variations representing intensity variations of the particular color cause variations in luminescence as in other television systems. This "velocity" system involves using a signal having successive color components and, at the picture tube, beam accelerators triggered by pulses (or equivalent means) in the signal, in proper relation to the sequence of color components, to select a particular phosphor layer on a velocity basis at the time when the corresponding color component of the signal is in control of the intensity of the beam. Examples of such a system are to be found in the U.S. patents of Szegho 2,455,710, Bronwell 2,461,515, Burton 2,580,073 and Koller 2,590,018 among others.

Another approach to the use of a multi-layer phosphor screen involved the association with the respective inner layers of special and complex anodes, apertured plates and reflectors by which the beam is caused to selectively activate one or another layer at a time. See U.S. Patent of Forgue 2,590,764, which also describes a two-color tube employing a single cathodoluminescent material that emits different colors dependent upon the density of the beam. As to the latter, see also Szegho 2,431,088.

The present invention, in contrast, depends upon two concepts not before utilized (so far as is known) to make possible the use of a picture tube having two or more (preferably three) discrete layers of phosphors of different colors located immediately behind the tube face, and permitting the presentation of the different color components in such rapid succession as to give the visual effect of a polychrome picture.

First, the new system employs a signal controlled variation of the depth of penetration of the beam into the multi-layer screen by control of the electron emission so that one, two or more of the layers are activated at any instant; and second, with this depth control is an automatic shutter action by which, when a forward layer is activated to give its particular color, the color from rearward activated layers is cut off or substantially reduced in intensity.

The control of depth of penetration rests on the finding that the depth of penetration of a cathode ray into a phosphor screen is a function of the number of electrons in the beam with which the phosphor mass is bombarded. The number of electrons or, in other words, the beam density, is ordinarily varied manually to adjust the picture brilliance, as by varying the bias of the cathode of the picture tube gun, and is also varied by the signal in accordance with light intensity variations over the area of the scene to be pictured. It is found that such variation of beam density not only varies the luminescence but varies the depth of penetration, so that a different slice, so to speak, of the phosphor mass is the predominant source of luminescene at each level of density. This occurs without change in the initial velocity of the beam, which is determined by its voltage, controlled commonly by the anode voltage or voltages and assumed for the present purpose to be a fixed value.

This relation of depth of penetration to beam density is experimentally shown in a simple way by a picture tube of conventional type modified only in that the phosphor layer at the tube face consists in the main of phosphors which give white light when activated and which at the rear side are thinly coated or contaminated with a copper salt giving a green light when activated. With a fixed anode voltage, the cathode bias is varied, as for conventional brightness control, over a range which at one extreme causes the rearward green coating to be activated. In that condition, green light is seen at the tube face. As the bias is so changed as to cause the beam density to increase, the light seen at the tube face becomes progressively less green until eventually the green color almost disappears and an almost pure white light appears; showing that the cathode ray beam has penetrated progressively deeper into the mass until only the white portion is activated in substantial degree and the rearward green layer is activated very little. By changing the bias in the opposite direction to decrease beam density, the visible light is made progressively more green until at the extreme the light is again a strong green showing little or no dilution by white and evidencing a lesser penetration of the phosphor mass.

Thus, by causing the signal to shift the beam density stepwise at intervals related to the reception of sequential color components of the signal, the depth of penetration of the beam into the multi-layer phosphor mass is varied in increments of such size as to cause the effective limit of penetration to shift from one color layer to another of the multi-layer screen.

This control of the depth of penetration, by control of beam density, is not in itself sufficient to give a sharp color selection because when the beam penetrates through two or more layers to fully activate a forward layer it also activates the penetrated layers behind and causes emission of light of two or more colors at once. Although the principal emission is from the forwardmost layer that is penetrated, in accordance with the principle that the velocity is least and the luminescence is greatest at and near the limit of penetration, it nevertheless is true also that any layer behind that layer is activated and is emitting some light of a different color, which is not the ideal situation.

To eliminate that different color from view, this invention provides as a second feature (also useful in other multi-layer systems) a system of shutter layers in front of the respective interior layers, that is to say, on the side toward the tube face of each phosphor layer except the phosphor layer next to the tube face. Each such shutter layer is of a material which is substantially translucent when not activated, so as not substantially to obstruct the light emitted by an activated phosphor layer behind it, but which when activated by electron bombardment acts transiently to substantially cut down or to shut off the transmission of color to the tube face from an activated layer behind it; all without fully shutting off the passage of beam electrons to the layer or layers in front. Examples of appropriate materials are given below.

Taking a three-color system, blue-red-green, as an example, the three phosphor layers may be arranged with the green at the tube face, the red in the middle and the blue at the innermost position. Other arrangements are possible, but this one will serve as an illustration. Between the green and red layers, and between the red and the blue layers, are shutter layers. The signal applied to the control electrode of the tube includes sequences of voltage variations representative of intensity variations of the blue, red and green components of the scene to be reproduced; and either as applied to that electrode or to an earlier receiver component responsive to it, the signal includes a further variation synchronized with these color component variations, which causes changes in beam density in three steps, the lowest level of beam density coming into play when the blue component of the signal takes control of the tube, the middle level when the red component takes control and the highest when the green takes control. Thus, for the blue, the beam penetrates effectively only the rearmost or blue phosphor layer; and since all layers in front transmit light, the blue component of the signal sequence is reproduced at the tube face. For the red, the beam penetrates the red phosphor layer (without reaching the green layer) and also activates the blue layer behind it as well as the intermediate shutter layer, causing the shutter to be activated to substantially cut down or eliminate the transmission of blue light so that only the red light emitted by the red phosphor layer is visible at the tube face. For the green component, the beam density is increased to cause penetration into the green phosphor layer, with some continued activation of the blue and red layers and activation of both shutter layers, so that in like fashion only green is visible at the tube face because of the substantial reduction or elimination of transmission of blue and red light.

The stepwise shift of the beam density level by which this selection is made can occur at any desired interval, such as after each line is scanned or after each field is scanned.

The shutter layers, translucent when inactivated (at least to the light from rearward layers), may respond to electron bombardment in any of several ways to bring the color blocking action into play. The material of these layers may be one which responds to absorb substantially all of the light emitted by the phosphor layer behind it, and which upon de-activation again becomes translucent within a time short enough to leave it in readiness for the next activation. Or the shutter may be of a material which responds by becoming fugitively opaque to light, as do a number of alkali halides, some of which can be "erased" to become translucent again in time for the next activation. In another form, the shutter layer may be of material that reacts to electron penetration by generating a radiation which, in combination with light of the color to be blocked, produces an invisible resultant wave length. Or the material may be one which when activated filters out the particular color to be blocked, while retaining its capacity to pass the electron beam in sufficient degree to permit activation of the screen layer or layers beyond. Another suitable material is one which luminesces to give colors complementary to the color to be blocked so as to give a resultant white light, or substantially white light, which need be only of low intensity because of the reduced intensity of the light from the color layer behind when maximum luminescence is occurring in a color layer ahead, and which therefore has only a tolerable diluting effect on the color to be viewed.

It will be evident that these shutter layers may be used also with a multi-layer system of diverse phosphors in a tube in which the control of the depth of beam penetration (i.e., the selection of the layer whose color is to be viewed) is effected by a control of beam velocity rather than by the novel and preferred control of beam density.

Figure 2:
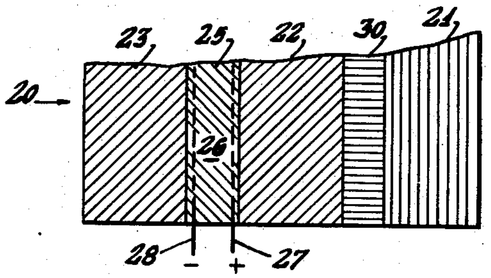
Figure 3:
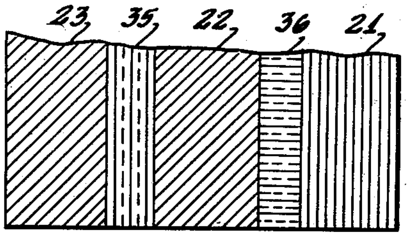
Figure 4:
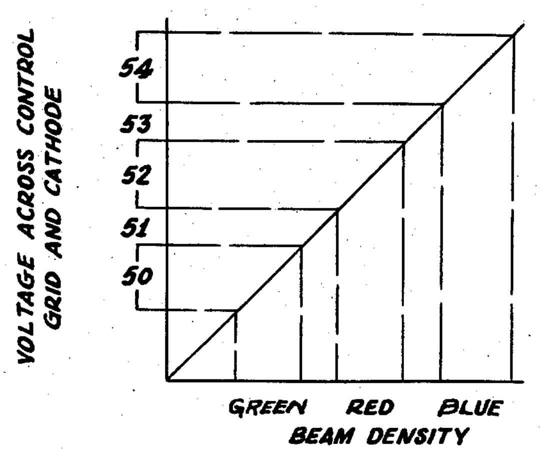
Figure 5:
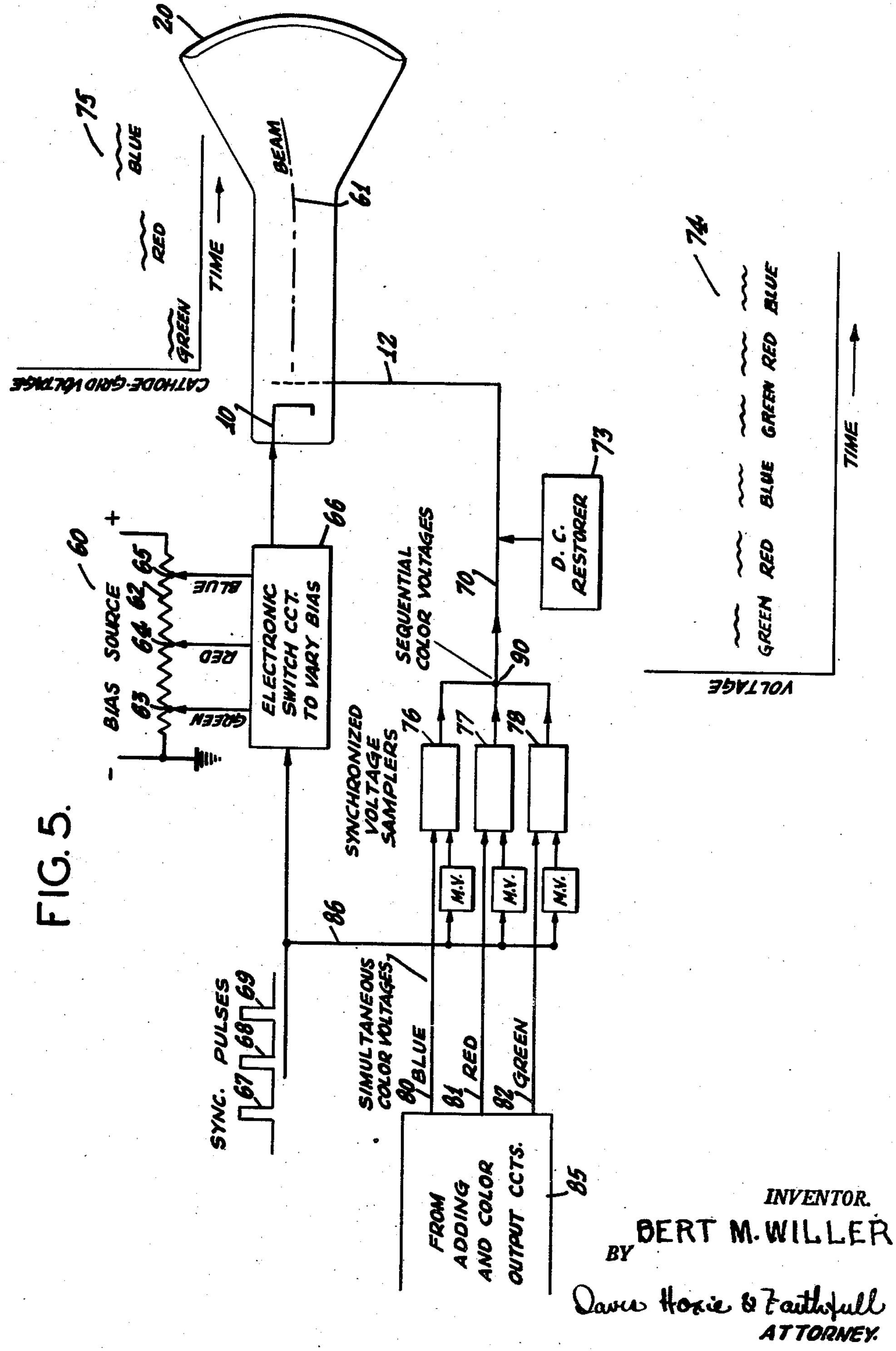

In the accompanying drawings, Figure 1 is a schematic diagram of one form of picture tube for employment of the invention. Figure 2 is an enlarged sectional view of a portion of the multi-layer phosphor mass of Figure 1. Figure 3 is a view like that of Figure 2 but with a different form of shutter material, as for use in a system for reproduction in colors of reduced intensity. Figure 4 is a chart of the relation between voltage controlling the cathode ray and electron emission in terms of the resulting color made visible at the tube face. Figure 5 is a schematic circuit diagram for a part of the receiver circuit.

In the picture tube of Figure 1, the arrangement is that of a conventional tube using electromagnetic deflection means. It has a cathode 10 with heater 11, a control grid 12, first anode 13, focus coil 14, vertical deflection coils 15, horizontal deflection coils 16 and an aquadag coating 17 forming the second anode, with a high voltage connection 18. The multilayer phosphor screen 20 at the tube face, in the path of the cathode ray beam, is shown more fully in Figure 2.

The multilayer phosphor screen 20 consists of three layers of cathodoluminescent phosphors of individually known composition, construction and mounting; viz., "green" layer 21 adjacent the tube face, "red" layer 22 behind the "green" layer, and "blue" layer 23 behind the "red" layer, each of these serving, when penetrated by the cathode ray beam, to emit light of the color for which it is here named. Between the red and blue layers is a shutter layer 25 consisting of an alkali halide material 26 of known composition and construction, together with a positive electrode 27 on one side and a negative electrode 28 on the other side, energized from a local source (not shown) and serving to promote erasure of opacity centers developed in the halide layer by electron bombardment. These electrodes, being for example of wire mesh or perforated sheet metal, are capable of passing both light and the electron beam so as not to interfere with the action of the tube, their apertures being aligned with phosphors of the adjoining cahodoluminescent screens. Between the red and green layers is a shutter layer 30 like shutter layer 25 and serving a like purpose with respect to the red layer.

Assume, for example, an interval of $1/60$ second in which there is applied to the control grid 12 an amplitude modulated signal representing one field of interlace scanning of the scene to be reproduced and representing the intensity variations of its blue component. The circuits and parameters of the system are such that the control grid of the picture tube then causes the electron beam to have a density of electrons such that it penetrates only the blue layer 23 of the multilayer phosphor screen 20. The beam scans that screen layer in alternate lines causing successive phosphor spots in the several lines to luminesce blue in a way that is visible at the tube face. After the usual blanking for retrace, the beam commences the scanning of a new field. For that field, the signal controlling the grid 12 represents the interlace scanning of a field of the scene and represents the intensity variations of its red component. As described below, for that red portion of the signal, the level of the cathode-grid voltage is so altered that the beam density is stepped up to a higher level causing penetration into red layer 22, activating it and also activating blue layer 23 and shutter layer 25. Signal variations representing intensity variations of the red component of the scene then cause variations of beam density which vary the luminescence of the red layer 22. However, only the red from layer 22 is seen at the tube face because the activation of the halide layer 26 causes it to develop transient deposits forming successive opacity centers at the successive points of electron penetration. These centers mask the blue light from the phosphors of blue layer 23 immediately behind it. As the beam moves on in its scanning, each opacity center is erased by movement of the deposit to the positive electrode in accordance with the known action of such a system, which needs no further description. (See Rosenthal, 2,330,171 and 2,330,172.) This erasing action, aided by the heat generated by the cathode ray bombardment, is also promoted by the electrodes 27, 28 in known manner.

A like effect comes about during the next scanning of a field when the signal represents the green component of the scene and when, as described below, the beam density is stepped up to a new level (giving a new bracket of emission values) such that the beam penetrates into the green layer 21 and causes it to emit light in accordance with variations of the green component of the signal. In that condition, all three phosphor layers and both shutter layers are activated in some degree, but any blue light from layer 23 is masked by the opacity centers developed in the halide layer 26, and red light from layer 22 is similarly masked by the like centers developed in the halide material of shutter layer 30.

The alternative multi-layer screen of Figure 3 is essentially the same in its blue, red and green layers but different in its shutter layers. In this case, useful for reproduction of a scene in color of reduced intensity, e.g., pastel, the shutter layers do not mask light from the phosphors behind them but act by emitting a complementary color which results in some transmission of light to the tube face along with the light from the forward color layer being scanned and fully activated. However, that light incidentally transmitted from the rear is not colored but is white, or practically so, and serves simply to reduce the intensity of the light from the forward layer then being activated and scanned. Such a shutter layer effectively blocks color from the rearward layer.

Thus, in Figure 3, the shutter layer 35 between the blue screen 23 and the red screen 22 consists of phosphors which when activated incident to scanning of a forward layer emit a yellow light of low intensity comparable with that of the light emitted by the blue layer when maximum luminescence is in a forward layer. This yellow combines with the blue to give essentially a white light that reduces in intensity, but does not change the essential color of, the light emitted by a forward screen, red or green. Similarly, between the red and green screens 22, 21 is a phosphor layer 36 that emits white light to reduce the red from layer 22 to a pink or reduced red when the green layer 21 is being activated and scanned. The combined light transmitted from behind the green layer, i.e., the white from 23—35 and the pink from 22—36, does not materially affect the green except to reduce its intensity. Using phosphor screens at 21, 22 and 23 which emit strong colors when fully activated, this system is capable of reproducing a scene in an attractive pastel tone. The reduction of the intensity of color from the forward layer by this light from one or more rearward layers is minimized by the fact that the rearward layer or layers are not fully activated at the time when a forward layer is the site of maximum luminescence because of being the layer of minimum electron velocity. (It will be understood that the terms "fully activated" and "maximum luminescence" with respect to the most forward layer that is penetrated are relative terms, and allow for the fact that the degree of activation and luminescence varies during the scanning of that forward layer in accordance with the signal, and also is adjustable by the manual "brilliance control.")

Using the now conventional interlace scanning, the interval in which the shutter action of the shutter layer material must be substantially terminated (i.e. the limit on its substantial persistence, or what may be called its time of substantial erasure) is the time required for two field scannings. In the example given, this is 2/60 or 1/30 second. It is this interval because any individual point on the multi-layer screen that is penetrated by the beam (e.g., the mid point in the first "odd" line) is not again penetrated until the beam has completed the scanning of the odd lines of that field and also the "even" lines of the next field, and has returned to that first "odd" line. When the beam returns to that point, its density is shifted to a new level so that it penetrates to a different layer, and it is then necessary that both shutter layers be substantially restored, at that point, to their normal condition. Thus, after penetration of a point of the green layer, with concomitant activation of the rearward color and shutter layers at that same point in the raster, the beam completes the scanning of the green layer, then at reduced density scans the blue layer on the "even" lines of the raster, and then at the intermediate density level starts the scanning of the red layer on the "odd" lines. For that "red" period, it is necessary that at the point under consideration in the first "odd" line of the raster the shutter layer lying between the red and green layers be in its normal or "open" condition so that the red light emitted upon activation of the red phosphor at that point will be visible at the tube face without effect from the shutter in front of it. In that condition of course the other shutter layer is re-activated at the same point to cut off or cut down the forward transmission of blue light from the rearmost layer, which is simultaneously activated.

The interval for substantial erasure of the shutter action is the same, i.e., the time of two field scannings, in the other example mentioned in which the shift from one color to another occurs after each line instead of after each field, because the interval between color changes makes no difference in the interval between successive penetrations of any given point on the raster, the latter being dependent on the rate and manner of scanning.

Figure 4 shows the relation between voltage across the cathode and grid of the picture tube and the resulting levels of beam density in terms of color output from the phosphor layer thus selected as the limit of beam penetration. The distinctive characteristic of the cathode-grid voltage is that it has three different median levels or three brackets, one for each color. "Median level" is simply a convenient term of reference to express the fact that for any one color there are amplitude variations above and below some median value, not otherwise significant in itself, and that these variations for any one color do not overlap those for another color. In other words, there are different brackets of voltage variations, preferably separated by spacing brackets, within the total range of cathode-grid voltage variation.

Thus, in Figure 4, the relation is shown between these different brackets and the two correlated factors of beam density and visible color output. The bracket 50 of cathode-grid voltage variations causes such an amount of electron emission (other tube parameters being appropriately chosen) as to make the beam penetrate the outermost or forward layer (e.g., green); and within that bracket the signal variations which are so applied as to vary the cathode-grid voltage cause emission variations corresponding to intensity variations of that color component of the scene to be pictured. Above bracket 50 is a guard band or spacing bracket 51 of voltage values and above it is the bracket 52 representing another color component, e.g., red; and similarly there is a spacing bracket 53 between that color bracket and the third color bracket 54 which is here taken to represent blue and which causes the beam to penetrate only the innermost layer. The abscissa of Figure 4 shows the corresponding effects in terms of visible color output resulting from the selection of the depth of penetration into the multi-layer screen with its interlarded shutter layers as already described.

The particular design of the individual color layers follows known practice as to choice of phosphor, and phosphor size and thickness. This design, as before, involves a relation to the working values of beam density and cathode-grid voltage at which the layer is activated to give a desired range of luminescence. The only special factor introduced here is that the different layers operate at different brackets of beam density, which requires compensation so that the different layers nevertheless will give properly related degrees of brilliance. This introduces a new factor but no new principle as to any individual phosphor layer and it therefore can be dealt with in each concrete case by use of known principles of phosphor screen design.

The multi-layer cathode ray picture tube in accordance with this invention may be used in a color television system utilizing a sequential color signal having cyclically recurring components, one for each primary color of the system, or a color signal in which all the primary color elements or equivalents thereto are transmitted and received simultaneously, as with the so-called NTSC color signal. When a "simultaneous" type of signal is transmitted, it is necessary to convert it at the receiver to a "sequential" type of signal for application to the picture tube. In the case of a signal of the NTSC type, this conversion can be effected by uniting in one current selected sequential samples of the three separate currents representative of green, red and blue which are derived in the "adder" from the so-called Y, Q and I components of the transmitted signal as amplified and detected. For a description of a color television receiver having circuits to derive those three color-component currents, but designed to operate with a three-gun tube in a dot sequential system, reference is made to "Color Television Fundamentals" by Milton S. Kiver, McGraw-Hill Book Co. (1955), more particularly chapter 3. The modified part of such a receiver circuit as used to operate with the tube of the present invention is shown in Fig. 5, without showing the unmodified parts.

In Fig. 5 is shown diagrammatically a picture tube of the present invention with the multi-layer screen 20, cathode 10 and control grid 12. The beam 61 has its density controlled by the combined effect of the instantaneous signal voltage applied to the control grid 12 and the D.C. bias applied to the cathode 10. As already described, it is necessary for this tube to operate at three different levels or brackets of voltage, in synchronism with the sequential color changes of the applied signal. The preferred way to bring this about is to change the D.C. bias on the cathode 10 in steps in response to pulses incorporated in the transmitted signal either for this purpose alone or for other purposes such as the control of vertical or horizontal retrace deflection of the beam.

The circuit means for producing the stepwise changes of the D.C. bias across the control grid 12 and cathode 10 comprises the bias voltage source 60 with a resistor 62 connected across it. The resistor, by means of adjustable taps at suitable points 63, 64, 65 intermediate the extreme ends thereof, provides D.C. bias voltages of three different values which are selectively applied to the cathode 10 by the connections labeled "green," "red" and "blue" under control of electronic switch circuit 66. The resistor 62 is so designed, and the taps are so located, that the instantaneous bias on the cathode 10 has one or another of three values such that when the signal is applied to the grid the cathode-grid voltage is in one or another of the three voltage brackets 50, 52, 54 of Figure 4, causing the beam density to be at one or another of the three operating levels.

Electronic switch circuit 66 is a circuit arrangement of known type comprising three sequentially acting stages of multi-vibrators, which are responsive to synchronizing pulses 67, 68 and 69 derived from the signal to apply each of the voltages obtained at the taps 63, 64 and 65 to cathode 10 in sequence. A D.C. restorer circuit 73 is connected to the grid input circuit in the known manner.

The synchronizing pulses 67, 68, 69 may, for example, be those which are convenionally included in the signal to control retrace deflection of the beam. The vertical retrace pulse is used when an entire field is scanned by the beam at a particular beam density level during the period when a particular color component of the signal is being reproduced. The horizontal retrace pulse is used when the system is "line sequential," that is, when a particular color component of the signal persists only for the period in which a single line of the raster is scanned, and a color change occurs after each line. These sync pulses are derived from the signal by the usual sync separator circuit which needs no description, and in Figure 5 they are shown as they come from such a circuit.

Assume that there is applied to the grid 12 through line 70 (disregarding for the moment the circuitry to the left of point 90) a sequential color signal consisting of voltages representative of each of three primary colors, each color component being applied during a period corresponding to the interval of time in which either a line or a field, as the case may be, is scanned in the picture tube. This sequential relation of the color voltages is depicted in graph 74. When this color signal voltage is applied to the control grid 12 of the picture tube, the density of the beam 61 is instantaneously modulated in accordance with the variations of intensity of that color. Since the D.C. bias on cathode 10 is being changed after each color period in a stepwise fashion by the circuit 60—66 described above, the instantaneous density of the beam during any color period is accordingly determined by the combined effect of the two parameters, namely, the color signal voltage and the particular D.C. bias selected by the electronic switch 66.

The operation of the circuit and tube is as follows. The first synchronizing pulse 67 when applied to switch circuit 66 operates a first multi-vibrator stage thereof to close the circuit from tap 63 to cathode 10, thereby applying a D.C. bias voltage causing the beam density to be at the highest of its three operating levels. During this period, a color signal representing the shades of green color of the scene is being applied to the control grid 12. The net effect is that the beam penetrates the forwardmost or green layer 21 (cf., Figure 2 or 3) and excites it with varying intensity according to the signal modulation. Through the shutter action already described, the colors from the rearward color layers are shut off or reduced to an inconsiderable level and green or substantially only green is visible at the tube face. When the second synchronizing pulse 68 arrives and is applied to the electronic switch circuit 66, the first multi-vibrator, i.e., the one associated with the green bias voltage tap 63, will be made non-conducting and the multi-vibrator associated with the red bias voltage tap 64 will be activated to close the circuit from that tap to cathode 10, whereby the D.C. bias is altered and the density of the beam 61 will be such that the beam penetrates only to the red layer 22. In a similar fashion, the third pulse 69 intervening between the red and blue components of the signal will render the red multi-vibrator non-conducting and cause the multi-vibrator associated with the blue voltage tap 65 to apply the proper new bias voltage to cathode 10, whereby the beam penetrates only the blue layer 23.

At the upper right in Figure 5 is a simplified chart 75 of the relation between cathode-grid voltage, as thus determined by the signal voltage and the synchronized sequentially changing D.C. bias, and the visible color output as it varies with time in accordance with the sequential color changes of the signal.

The operation of the picture tube as described depends on the applied color signal being sequential. When such a signal is transmitted and received, it can be applied directly to the picture tube after the usual steps of first detection, amplification, demodulation and sync separation. When the received signal is of the simultaneous type, as for example when it is an NTSC color signal, it is necessary to convert it to a sequential signal before application to the control grid of the picture tube. Accordingly, there is also shown in Figure 5 a circuit to convert the separate 3-color voltages derived from this NTSC color signal into a single color voltage which is of the sequential color type and accordingly can properly operate the picture tube of the invention.

At the lower left in Figure 5 are shown schematically the three separate lines 80, 81 and 82 leading from the so-called adding and color output circuits 85 of a conventional receiver designed to receive an NTSC color signal. These three lines carry separate signal voltages, each of which represents a particular primary color component of the whole signal, these voltages being derived in known manner from the Y, Q and I components of the signal as received.

These three lines 80, 81 and 82 lead to a three-stage electronic sampler 76, 77 and 78. Each of the samplers may take the form of a single stage vacuum tube amplifier whose cut-off bias is under the control of one stage of a three-stage ring counter of the known type. Each of the samplers 76, 77 and 78 is shown associated with a multi-vibrator MV. Thus, the three multi-vibrators form a ring counter arrangement such that but one of the multi-vibrators is conducting or is "on" at a time in response to sync pulses 67, 68 or 69, whereby the bias of its associated amplifier is reduced to less than cut-off allowing the sampler thus to be "on," i.e., to pass or amplify a color voltage from lines 80–82 through to the common output 90. Concurrent with the "on" condition of one unit of the multi-vibrator-amplifier combination, the remaining two sampler stages are in their "off" condition since the associated multi-vibrators of the ring counter are "off."

The on-off switching is so timed by the sync pulses in the present illustrative case that in effect each of lines 80, 81, 82 is left open or non-conducting for two-thirds of the time and is closed or made conductive to deliver current to the output junction 90 for but one-third of the time. The pulsing of one line to the "on" condition pulses the formly "on" line to the "off" condition. The "on" periods are staggered as among the three lines 80, 81, 82, so that the respective "on" periods are sequential and the junction 90 therefore receives in sequence a one-third time sample of the signal current of each of the input lines 80, 81, 82. Junction 90 is connected by line 70 to the control grid 12 of the multi-layer picture tube so as to apply to the tube the sequential color signal thus developed at junction 90.

If the system is to be operated, for example, on a field sequential basis, with a field scanning time of 1/60 second, the synchronizing pulses (e.g., the vertical retrace pulses) are at intervals of 1/60 second, and the sampler 76–78 under control of a respective one of its associated multi-vibrators MV closes each of lines 80, 81, 82 for a like interval, these "on" periods being sequential as among the three lines. Thus, the "green" pulse 67, when it acts on the bias control circuit 66 to bias the picture tube for "green" operation as described above, acts also upon the sampler 78 under control of its associated multi-vibrator to close line 82 for 1/60 second so as to deliver the "green" component of the signal to junction 90 and thence to the picture tube by way of line 70. When the succeeding pulse 68 changes the picture tube bias to give the proper beam density for "red" operation, it acts also on the sampler 77 to open line 82 and to close line 81, thereby delivering the "red" component of the signal to junction 90 and to the picture tube. Similarly, pulse 69 opens line 81 and closes line 80 to deliver the "blue" signal when it biases the picture tube to give a beam density for "blue" operation.

Although it is possible to incorporate special pulses in the signal for the control of this sampler, and to make the pulses different in some characteristic which enables the sampler to discriminate among them and thereby respond selectively, it is simpler to use pulses that are of uniform character and that are present in any event for other operations on the same time schedule, and to employ a sampler which responds to all pulses alike but in a way to effect progressive and sequential closing of the three signal lines 80, 81, 82 and at each step the attendant re-opening of the previously closed line.

What is claimed is:

1. In a color television receiver, a picture tube with a multi-layer screen to be scanned by a cathode ray beam, said screen comprising at least two color layers of different cathodoluminescent materials for emitting light of different colors when penetrated by said beam, together with at least one shutter layer transparent to the cathode ray beam and normally translucent but transiently responsive to penetration by said beam to substantially block the forward transmission of the color from the rearward color layer, and means whereby the depth of penetration of the cathode ray beam into said screen is varied sequentially in synchronism with sequential color components of an applied signal to selectively activate either one or both of said color layers with activation of the intermediate shutter layer when both rearward and forward color layers are activated.

2. A television receiver having a picture tube for reproducing a scene in color in response to a signal having sequential components representing different color components of the scene, said picture tube having a multi-layer screen with at least two layers of different cathodoluminescent materials for emitting light of different colors when penetrated by a cathode ray beam and an intermediate shutter layer transparent to a cathode ray beam and normally translucent but transiently responsive to penetration by said beam to substantially block the forward transmission of the color from the rearward color layer, means for generating and controlling a cathode ray beam for scanning said screen in synchronism with the signal, and means acting in synchronism with color changes of the signal for varying stepwise the density of said beam whereby to control its depth of penetration into said screen and thereby selectively activate one or both of said color layers with activation of said shutter layer when both color layers are activated.

3. A cathode ray tube for reproducing color television images comprising a multi-layer screen in which are layers of different cathodoluminescent materials responsive to an electron beam of varying density to emit different particular colors corresponding to the density level of said beam, and means acting in synchronism with sequential color changes of the signal for establishing the median density of said beam at different levels at each of which color from a single layer is seen at the tube face.

4. A receiver for producing television images in color, comprising a cathode ray tube having a multi-layer luminescent screen adapted to produce light of different primary colors dependent upon the density of the beam, and means controlled by signal voltage pulses consisting of one voltage pulse for each color component of a sequential color signal to vary the density of the beam in sequential steps to selectively activate different layers of said screen.

5. A cathode ray tube having a viewing face and adjacent thereto a multi-layer screen scanned by the cathode ray beam, said screen having at least two layers of different cathodoluminescent materials for emitting light of respectively different colors when penetrated by the said beam, in combination with a shutter layer transparent to said beam and normally translucent but transiently responsive to penetration by said beam to substantially block forward transmission of color from the rearward of said cathodoluminescent layers.

6. A tube as in claim 5 in which said shutter layer comprises material that is rendered transiently opaque when penetrated by said beam.

7. A tube as in claim 5 in which said shutter layer comprises cathodoluminescent material that emits light of a color complementary to that of the rearward of said first two layers when penetrated by said beam.

References Cited in the file of this patent

UNITED STATES PATENTS

| | | |
|---|---|---|
| 2,431,088 | Szegho | Nov. 18, 1947 |
| 2,543,477 | Sziklai et al. | Feb. 27, 1951 |
| 2,566,713 | Zworykin | Sept. 4, 1951 |
| 2,590,018 | Koller et al. | Mar. 18, 1952 |
| 2,704,783 | Siziklai | Mar. 22, 1955 |